US005850233A

United States Patent [19]

Otsuka et al.

[11] Patent Number: 5,850,233

[45] Date of Patent: *Dec. 15, 1998

[54] CONVEYING ROTATIONAL MEMBER FOR AN INK RECORDING APPARATUS, AND INK RECORDING APPARATUS HAVING THE SAME

[75] Inventors: Naoji Otsuka, Kawasaki; Hitoshi Sugimoto; Kentaro Yano, both of Yokohama, all of Japan

[73] Assignee: Canon Kabushiki Kaisha, Tokyo, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 488,461

[22] Filed: Jun. 7, 1995

Related U.S. Application Data

[63] Continuation of Ser. No. 203,613, Feb. 28, 1994, abandoned, which is a continuation of Ser. No. 58,492, Sep. 18, 1990, abandoned.

[30] Foreign Application Priority Data

| | | | |
|---|---|---|---|
| Sep. 18, 1989 | [JP] | Japan | 1-241048 |
| Jan. 30, 1990 | [JP] | Japan | 2-20152 |
| Apr. 11, 1990 | [JP] | Japan | 2-95482 |
| Apr. 11, 1990 | [JP] | Japan | 2-95483 |

[51] Int. Cl.[6] .............................. G01D 15/24; B41D 4/00

[52] U.S. Cl. ............................... 346/136; 346/134; 347/4

[58] Field of Search .................................... 346/136, 134; 347/4, 101, 104; 101/367, 416.1, 420; 400/639.1, 641, 701

[56] References Cited

U.S. PATENT DOCUMENTS

| | | | |
|---|---|---|---|
| 3,042,179 | 7/1962 | Stern | 197/138 |
| 3,602,140 | 8/1971 | Sudduth | 101/420 |
| 3,791,644 | 2/1974 | De Moore | 271/80 |
| 4,165,029 | 8/1979 | Mitchell | 226/25 |
| 4,212,555 | 7/1980 | Rosenstock | 400/639.1 |
| 4,300,145 | 11/1981 | van Raamsdonk | 346/140 R |
| 4,313,124 | 1/1982 | Hara | 346/140 R |
| 4,345,262 | 8/1982 | Shirato et al. | 346/140 R |
| 4,459,600 | 7/1984 | Sato et al. | 346/140 R |
| 4,463,359 | 7/1984 | Ayata et al. | 346/1.1 |
| 4,558,333 | 12/1985 | Sugitani et al. | 346/140 R |
| 4,629,177 | 12/1986 | Roddeman et al. | 271/240 |
| 4,723,129 | 2/1988 | Endo et al. | 346/1.1 |
| 4,740,796 | 4/1988 | Endo et al. | 346/1.1 |
| 4,860,026 | 8/1989 | Matsumoto et al. | 346/1.1 |
| 4,967,661 | 11/1990 | Duarte | 101/420 |
| 4,977,828 | 12/1990 | Douglas | 101/142 |
| 5,163,674 | 11/1992 | Parks | 101/416.1 X |
| 5,363,129 | 11/1994 | Kline | 346/136 |

FOREIGN PATENT DOCUMENTS

| | | | |
|---|---|---|---|
| 2734041 | 10/1978 | Germany . | |
| 5456847 | 5/1979 | Japan . | |
| 59-123670 | 7/1984 | Japan . | |
| 59-138461 | 8/1984 | Japan . | |
| 0188467 | 10/1984 | Japan | 400/641 |
| 59-214677 | 12/1984 | Japan . | |
| 6071260 | 4/1985 | Japan . | |
| 63-097649 | 4/1988 | Japan . | |

*Primary Examiner*—Peter S. Wong
*Assistant Examiner*—Gregory J. Toatley, Jr.
*Attorney, Agent, or Firm*—Fitzpatrick, Cella, Harper & Scinto

[57] ABSTRACT

An ink printer for printing on a recording medium using a liquid ink includes at least one rotatable member arranged in a region of a transport path of the recording medium. The rotatable member is located so as to be capable of contacting liquid ink for forming an image on the recording medium. The rotatable member includes a radially outermost perimeter portion which serves as a recording medium contacting peripheral surface. The outermost perimeter portion has an outermost edge which is continuously contactable with the printing surface of the recording medium. The bonding force with respect to the ink on the outermost edge is less than the sum of a bonding force between the recording medium and the ink on a surface of the recording medium, and the cohesive force of the ink itself on the surface of the recording medium. As a result adherence of the ink to the contacting peripheral surface of the at least one rotatable member is prevented.

16 Claims, 9 Drawing Sheets

CONVEYING ROTATIONAL MEMBER FOR AN INK RECORDING APPARATUS, AND INK RECORDING APPARATUS HAVING THE SAME

This application is a continuation of application Ser. No. 08/203,613 filed Feb. 28, 1994, now abandoned, which is a continuation of application Ser. No. 07/584,923 filed Sep. 18, 1990, abandoned.

BACKGROUND OF THE INVENTION

1. Field of the Invention

This invention relates to a rotational member for conveying a recording medium such as paper, film or synthetic paper in a recording apparatus for effecting recording using ink on the recording medium, and to a recording apparatus provided with the same. More particularly, this invention relates to a recording apparatus having a rotational member whose peripheral surface as discharge means for discharging the recording medium after recording continuously bears against the recording medium. Particularly effectively, this invention relates to an ink jet recording apparatus for discharging recording liquid to a recording medium (preferably by the use of heat energy) to thereby accomplish recording, and particularly to a conveying system for the recording medium in a recording medium conveying mechanism applied therein.

2. Related Background Art

In recent years, office automation instruments such as personal computers and word processors have widely spread, and various recording systems such as the wire dot system, the heat transfer system and the ink jet system have been developed as a system for printing out information input by these instruments. These recording systems are such that predetermined recording is effected on a recording sheet being conveyed, by recording heads of respective types, and there are remarkable differences between the respective recording heads.

Among them, recording apparatuses using the ink jet system or the bubble jet system have generally been preferred as recording apparatuses such as facsimile apparatuses and printers for their low noise during operation and the simplicity and inexpensiveness of their basic mechanical structure.

Now, in the various printers, it is regarded as ideal that a recording medium is discharged out of the apparatus after a recorded image has been completely fixated on the recording medium, but recording mediums carrying insufficiently fixated images thereon must be conveyed in order to make the apparatus compact and apparently shorten the time until the completion of recording.

Therefore, most apparatuses have been designed such that nothing is caused to bear against the printed surface of the recording medium after ink droplets have been discharged to the recording medium, or a spur or the like is caused to bear against the other portion of the recording medium than the recordable range thereof. There are also recording apparatuses of the pin feed type.

In the apparatuses of this type having no spur, when the paper discharge side of the recording apparatus is under a particularly high humidity condition or when a long footage of paper such as rolled paper is used as a recording medium, the slidability of the leading end of the discharged recording medium becomes bad and the flow of the recording medium becomes unsmooth, whereby flexure has occurred to the recording medium. Originally, even in an ink jet recording head, the spacing between the head and the recording medium is only of the order of 0.8 mm and therefore, the recording medium and the recording head contact with each other, and this has led to the very high probability with which the printed surface of the recording medium is stained. In any case, when the flexure is severe, the recording medium has often been caused by the recording head and get jammed. In apparatuses of the type in which a spur is caused to bear against the opposite ends of the recording medium which are outside the recordable range, there is the disadvantage that in principle, the printable range becomes narrow.

Further, in large apparatuses using recording mediums of JIS A3 and A2 sizes, the paper discharging property of the central portion is reduced and therefore, unsatisfactory paper discharge occurrs to thereby cause the trouble as noted above.

Also, from the user's viewpoint, there has been the disadvantage that the position of the spur must be changed each time in conformity with the width of the paper, thus requiring much time and labor, and if the setting is made rough, the printing range will be entered to thereby stain the printed surface.

In contrast, apparatuses which are compelled to convey a recording medium with the printed surface thereof bearing against a recording head find a solution thereto in the provision of a special recording medium or special fixating means, specifically, the use of not plain paper but paper exclusively for ink jet represented by coat paper of good fixativeness or the like, and further the mounting of a heat source such as a fixating device for expediting the desiccation of ink. In the former, the ink absorbing ability is very high and originally it is difficult for a problem to appear, but under a high humidity environment, a similar problem arises. Moreover, this type cannot cope with various recording mediums such as postcards, cut paper and OHP overhead projector film, and does not meet the needs of the market which demands plain paper recording. In the latter, the addition of the fixating device leads to a high cost, and to complete fixation within a short time to achieve the purpose by only fixation, a very high temperature heating process is required and complication of the apparatus is unavoidable. In this case, the occurrence of the unsatisfactory conveyance of the recording medium would pose the problem that before the quality of image, the medium itself is deteriorated.

Also, in an apparatus wherein the printing speed is slow and the time until the recording medium arrives at the spur is sufficiently long and ink is dried and fixated in the meantime, there has been the possibility of the recording medium being used under a normal environment, but in the apparatus of such a type, the spur has usually been of such a star shape as shown in FIG. 10 of the accompanying drawings wherein the peripheral surface thereof bearing against the recording medium is a discontinuous peripheral surface having thin and sharply pointed teeth so that the area of contact with the printed surface of the recording medium may be decreased as much as possible and the transferable area may be decreased to the utmost to thereby reduce the probability with the spur touches printed lines or characters and also, even when ink has been transferred to the spur, the spur may be rotated to cause the transferred ink to be re-transferred to thereby reduce the amount of ink which will stain the printed surface to the utmost.

Therefore, even during the printing of characters, the transfer of ink to the spur has occurred and the stain of a row of discontinuous points like a dotted line which is called the trace of the spur has come to appear in the main scanning direction of the recording medium. Much more, after printing of high printing proportion such as graphics printing or solid printing has been done, the stain has become very conspicuous, and when the apparatus has been used under high humidity, the resultant print has been on a level which does not hold good as a product. Of course, this also holds true of a high paper feed speed machine, and further in a color printing apparatus, if the preceding print line differs in color from the next print line, the ink of the preceding print line is transferred to the spur and mixes with the ink of the next print line, and in the case of the C.M.Y. line ink, an entirely different color will occur or black ink will blur over a light color and thus again, the resultant print will not hold good as a product.

Also, recent years have seen an increase in office automation instruments such as compact portable lap top type personal computers and word processors, and of course, as the output apparatuses thereof, compact portable type ones have been desired and the size thereof has become smaller year after year and particularly, the tendency toward thinness is strong. Therefore, the recording head and the spur have become positionally very close to each other, and in any low-speed apparatus, the printed surface is fed to the position of the spur and arrives at the spur in two seconds or so after printing has been done and therefore, it is important to solve the above-noted problem.

Particularly, in ink jet recording, when solid printing or printing of graphics or the like which is high in printing duty is effected, the recording medium experiences wave-like deformation and the printed surface floats up a little and therefore, the gap between the recording head and the recording medium becomes narrower, and if paper discharge is unstable, the probability with which the printed surface is stained becomes higher.

As described above, there has been no technique for solving both the trouble of the paper feeding system and the trouble of the spur trace on the printed surface.

SUMMARY OF THE INVENTION

It is a primary object of the present invention to provide a recording medium conveying mechanism which, even if it contacts with the surface of a recording medium after printing, can greatly prevent the occurrence of a spur trace and can prevent unsatisfactory conveyance. It is also a primary object of the present invention to provide a recording apparatus which is provided with such conveying mechanism and can make the quality of image good. Particularly, in a recording apparatus using a recording head which does not contact with a recording medium, it is an object of the present invention to provide an apparatus which can satisfy the original life of the recording head.

It is another object of the present invention to provide a recording medium conveying mechanism which is further improved over the above-described conveying mechanism of the present invention and which can nearly eliminate the occurrence of a spur trace, and a recording apparatus provided with the same.

It is still another object of the present invention to provide a conveying system member for an ink recording apparatus which is used in a conveying system for a recording medium in the ink recording apparatus for effecting recording by the use of ink and which bears against the surface of the recording medium after printing and is rotated, characterized in that the peripheral surface of said member is of a shape in which it continuously bears against the recording medium, and the region of said member which contacts with the printing surface of the recording medium makes the bonding power with respect to the ink small relative to the sum total of the bonding power between the recording medium and the ink and the cohesive power of the ink itself, thereby preventing the adherence of the ink to said continuous peripheral surface.

It is yet still another object of the present invention to provide a conveying system member for an ink jet recording apparatus which is used in a conveying system for a recording medium in the ink jet recording apparatus for discharging ink liquid droplets to thereby effect recording and which bears against the surface of the recording medium after printing and is rotated, characterized in that the peripheral surface of said member is of a shape in which it continuously bears against the recording medium, and the width thereof in the direction of the rotational axis thereof 0.1 mm inward from the peripheral surface is 0.7 mm or less.

It is a further object of the present invention to provide a recording apparatus having recording means for recording images on a recording medium in conformity with recording information, conveying means for conveying the recording medium to said recording means, and discharge means for discharging said recording medium after recording, characterized in that said discharge means has a rotational member whose peripheral surface continuously bears against said recording medium, said rotational member being constructed of a film member having a water-repelling property.

Other objects of the present invention will become apparent from the following detailed description.

According to the present invention, in a paper feeding member which is represented by a spur bearing against a recording medium after printing, provision is made of a roller characterized in that the peripheral surface thereof is of a shape in which it continuously bears against the recording medium, whereby even before ink on the surface of the recording medium is fixated in principle, the ink may not be transferred onto the spur and the compatibility of conveyance and printing free of the spur trace is made possible.

Basically, it has found in the present invention that when the spur has come into contact with the ink, the balance of power with which the ink may or may not adhere is determined by the surface bonding power between the spur and the ink, the bonding power between the ink and paper and the cohesive power of the ink itself and by making such design that when the spur moves, the force with which the ink adheres to the spur is always made lower by using the shape of the present invention which utilizes the characteristic of this balance of power, whereby non-transfer of the ink to the spur can be achieved.

According to the present invention, it also becomes possible to give a degree of freedom to the design of the recording apparatus and feed the recording medium after recording back to a recording station, and recording good in quality of image can also be accomplished even if slight heat is imparted for heating and fixation.

DESCRIPTION OF THE PREFERRED EMBODIMENTS

Figure 1:
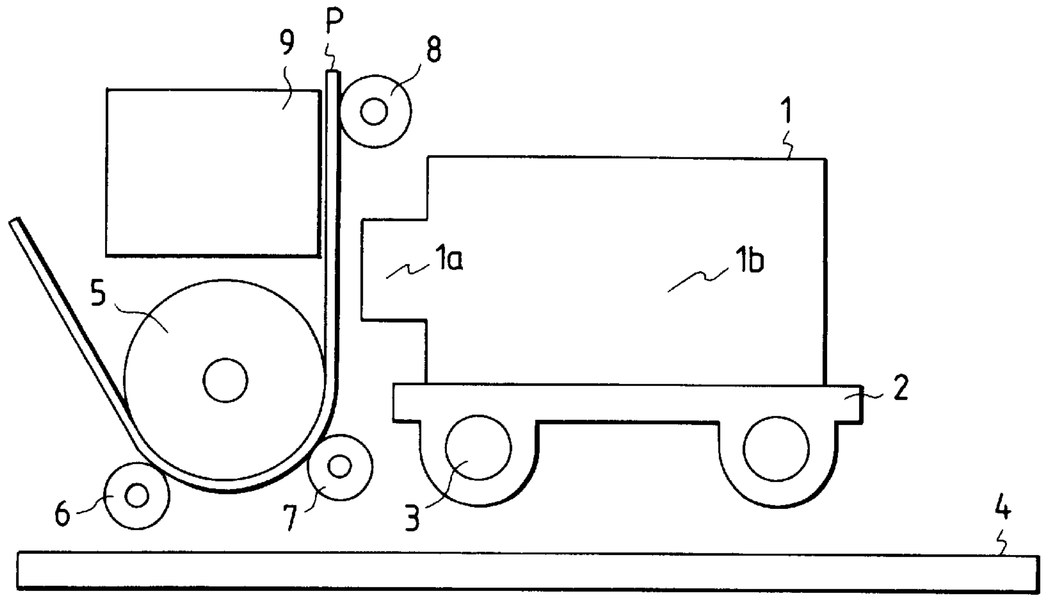
FIG. 1 illustrates the general construction of a printer using the present invention.

Referring to FIG. 1 which shows the general construction of a printer using the present invention, the reference numeral 1 designates a cartridge comprising a recording head 1*a* and an ink tank 1*b* which are made integral with each other, the reference numeral 2 denotes a carriage for scanning in the sub-scanning direction with the cartridge 1 carried thereon, the reference numeral 3 designates the guide shaft of the carriage 2, and the reference numeral 4 denotes the chassis of the base of the apparatus.

Figure 2:
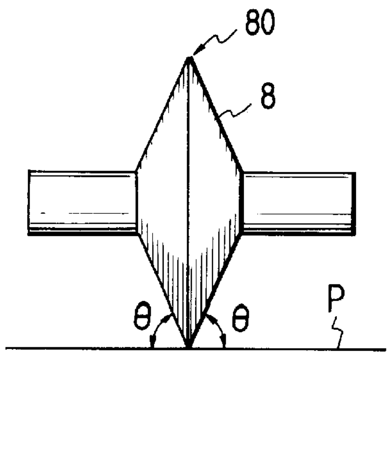
FIGS. 2 and 3 illustrate the construction of a spur according to a first embodiment of the present invention, FIG. 3 being a side view.
Figure 3:
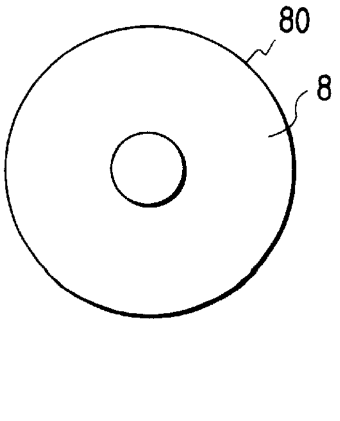
Figure 10:
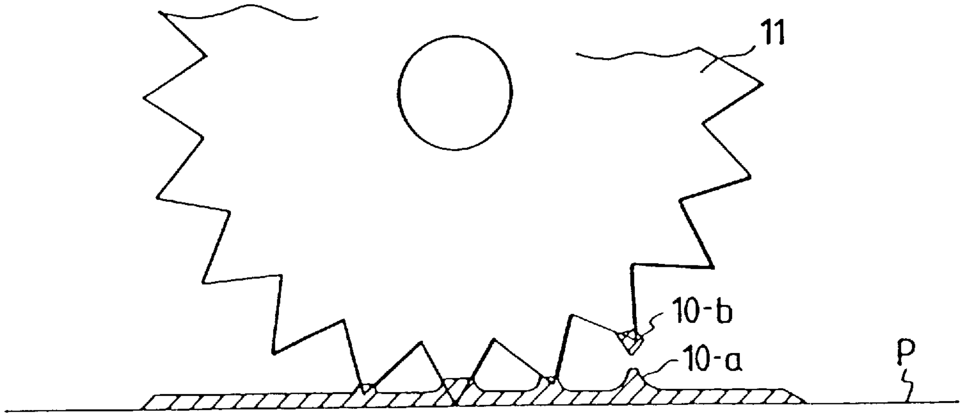
FIG. 10 PRIOR ART
FIG. 10 shows the transfer process of ink to a spur according to the prior art.

The reference numeral 5 designates a conveying platen roller, and the reference numerals 6 and 7 denote conveying rollers. The reference numeral 8 designates a spur according to an embodiment of the present invention. The spur 8 is of a shape as shown in FIG. 2 and FIG. 3 which is a side view corresponding to FIG. 2. The reference numeral 9 denotes a conveyance guide. P designates a recording medium. The reference numeral 10 in FIG. 8 denotes ink discharged onto the recording medium. The reference numeral 11 in FIG. 10 designates a spur according to the prior art, and FIG. 10 shows the transfer process of ink to the prior-art spur.

The recording head 1*a,* although not shown, is provided with a plurality of liquid paths filled with well-known liquid (ink). The ink filling these liquid paths is balanced in its surface tension and external pressure on the orifice surface in its steady state. Electro-thermal converting members are disposed in said plurality of liquid paths, and at least one driving signal for providing a rapid temperature rise beyond nucleate boiling is applied to these electro-thermal converting members to thereby generate heat energy and gasify the adjacent ink, thus causing film boiling. Thereby, a bubble corresponding to the driving signal is formed in the ink, and by the growth of this bubble, the ink may be discharged from the orifice surface to the recording medium P. Also, the bubble is cooled by the ink and contracts, and ink is supplied from the ink tank 1*b* into the liquid paths by capillary phenomenon.

By growing and contracting a bubble in the liquid paths filled with the ink as described above, the ink can be discharged from the orifice surface to form a liquid droplet. Accordingly, when the driving signal is applied in a pulse form to the electro-thermal converting members in conformity with image information, the growth and contraction of the bubble takes place in a moment, and the ink can be discharged from the orifice surface of the recording head 1*a* to the recording medium P to thereby accomplish recording.

The recording operation of the printer constructed as described above will now be described. As shown in FIG. 1, the recording medium P is first made to pass between the conveying roller 5 and the rollers 6, 7, and is set until it arrives at between the spur 8 and the guide member 9.

When the recording operation is then started, the ink cartridge 1 containing the recording head 1*a* therein is moved in the sub-scanning direction of the carriage 2 and also the ink is discharged from the orifice surface of the recording head 1*a* onto the recording medium P in conformity with recording information, whereby recording is effected. When the recording for one line is terminated, the conveying roller 5 is rotatively driven to convey the recording medium P by one line in the main scanning direction (the direction of arrow A). At this time, the recording medium P is conveyed while being held by the spur 8 and the guide member 9.

By the above-described operation being repeated, recording is successively effected, and the recording medium P after recording is discharged onto a stacker or the like, not shown.

Now, the spur 8 which directly contacts with the printing surface of the recording medium is of such structure that as shown in FIG. 3, a spur (like a counter of an abacus) formed of silicon resin whose peripheral surface 80 is of a rotational shape continuously bearing against the recording medium and which, in the front view of FIG. 2, has both-sides tapered symmetrically at an angle θ. Thus, the spur can continuously accomplish substantially point contact, and irrespective of the scanning direction of the recording medium, can prevent recorded images from being disturbed even if the spur rubs against the unfixated recording surface.

Figure 8:
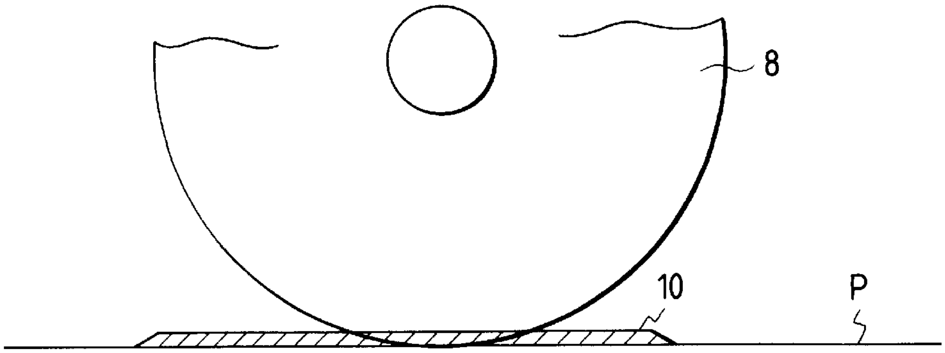
FIG. 8 shows the state of ink discharged onto a recording medium.

In the apparatus of the compact portable type according to the present embodiment as shown in FIG. 1, as previously described, the printing portion arrives at the spur 8 immediately after printing. That state is shown in FIG. 8. This situation is a situation in which the ink on which the spur is not settled is stationary on the recording medium P.

Figure 9:
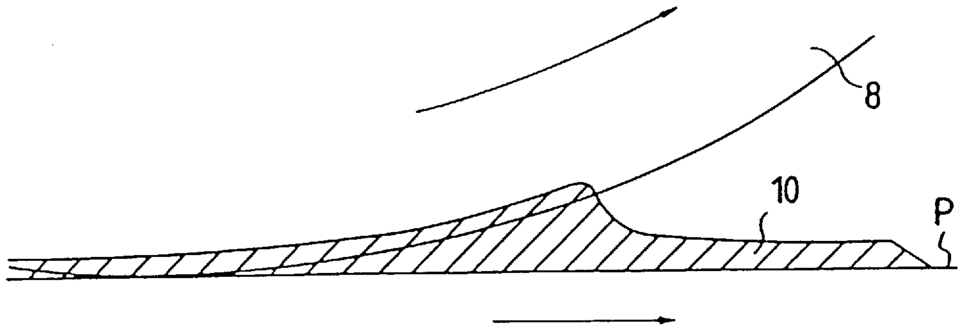
FIG. 9 is a schematic view for illustrating the energy level of ink adhering to the surface of a spur.

FIG. 9 shows a state in which the recording medium P has begun to move forward in the main scanning direction from the state of FIG. 8 and the spur 8 has begun to effect relative movement at the point of contact. As shown in FIG. 9, the ink adheres to the surface of the spur at the adherence energy level between the spur and the ink and therefore assumes a more protuberent shape than in the stationary state when it is stripped off by the rotation of the spur. However, the shape at that time is a flared shape with the protuberant point as the vertex. Considering the then balance of force, the peripheral surface of the spur 8 is a continuous surface and when the ink 10 has been dragged up in proportion to its adhering force relative to the spur 8, the cohesive power by the surface tension of the ink which tends to reduce the flared protuberance of the ink itself to thereby reduce the surface area becomes stronger and further, the underside of the ink 10 is restrained by the adhering force of the ink and the recording medium P over a large area, with a result that the ink is dragged down while sliding toward the recording medium P. Thus, the ink can be used without being transferred onto the spur 8.

If as in the prior art, the peripheral surface of the spur was a discontinuous surface, said balance of force would be momentarily destroyed and thus, the ink would be left on the spur. An extreme example of it is the example of the prior art shown in FIG. 10. In this case, because of the peripheral surface being a discontinuous surface, the force with which the adhering ink is continuously dragged down would be continuous as in the present embodiment and flared protuberances would be small and created at individual points of contact and the ink would be raised substantially vertically from the printing surface, and a constriction would be created between the ink 10-*b* on the edge portion of the spur 11 and the ink 10-*a* on the recording medium P and at last, the step area of the constricted part would become smallest and thus weakest, and the constricted part would be cut by the cohesive power provided by the surface tension of the ink 10-*a* and the ink 10-*b*. Therefore, in principle, the ink would be transferred onto the spur 11.

As can be seen from the description of FIG. 10, the superiority of the effect of the present invention is clear.

Table 1 below shows a test in which use has been made of a spur having the shape as shown in FIG. 2 and in which the angle θ formed by the tapered portion with respect to the printing surface is 80° and the contact pressure to the surface of the recording medium is set to 20 g and samples differing in the water-repelling property of the surface have been used under environments of different humidities to effect home feed immediately after a solid black line has been printed, to thereby examine whether a spur trace has appeared.

Table 2 below shows a similar test carried out for the shape of FIG. 10 and under the same other conditions.

Table 3 below a test in which the surface roughness of the spur has been varied relative to the test shown in Table 1.

Table 4 below shows a test in which, relative to the test shown in Table 1, use has been made of a spur having a water-repelling property of 110° and the angle formed by the tapered portion with respect to the printing surface has been varied.

The test of the water-repelling property has been carried out with the angle of contact with water as a standard parameter. The test of the contact pressure is shown in terms of the total pressure per spur with respect to the printing surface.

TABLE 1

| | Water-repelling property | | | |
|---|---|---|---|---|
| Humidity | 110° | 60° | 30° | 10° |
| 25° C./90% RH | OK | OK | NG | NG |
| 25° C./50% RH | OK | OK | OK | NG |
| 25° C./50% RH | OK | OK | OK | OK |

TABLE 2

| | Water-repelling property | | | |
|---|---|---|---|---|
| Humidity | 110° | 60° | 30° | 10° |
| 25° C./90% RH | NG | NG | NG | NG |
| 25° C./50% RH | OK | NG | NG | NG |
| 25° C./10% RH | OK | OK | OK | OK |

TABLE 3

| | Surface roughness | | | |
|---|---|---|---|---|
| Humidity | 0.1 S | 0.4 S | 2 S | 5 S |
| 25° C./90% RH | OK | OK | NG | NG |
| 25° C./50% RH | OK | OK | OK | NG |
| 25° C./10% RH | OK | OK | OK | OK |

TABLE 4

| | Angle Θ | | | |
|---|---|---|---|---|
| Humidity | 80° | 60° | 45° | 30° |
| 25° C./90% RH | OK | OK | OK | NG |
| 25° C./50% RH | OK | OK | OK | NG |
| 25° C./10% RH | OK | OK | OK | OK |

The data shown in Tables 1 to 4 are test data including the tests on the present embodiment and the prior art carried out in the aforedescribed form of tests.

According to Table 1, it is seen that where the other parameters are fixed, if in the present embodiment, use is made of a water-repellent spur having an angle of contact of 60° or greater with respect to water, there can be obtained a spur entirely independent of the fixativeness of ink attributable to the environmental humidity. Conversely, as shown in Table 2, in the spur of the conventional type, it is seen that even if use is made of a spur having a water-repelling property as high as 110° or greater, transfer will occur and the data has dependency on the environmental humidity.

This is apparent from the aforedescribed principle, and the spur in the present invention may pass over unfixated ink under high humidity because the ink will not originally be transferred to the spur due to the aforedescribed principle even if the spur is rolled in the ink liquid. It is considered to be because a boundary line between good and bad by the parameter of the water repelling property has been in the vicinity of the angle of contact 30° in the setting of the present embodiment that in Table 1, NG appears at the angle of contact 30° under high humidity. In any case, it can be understood from the comparison between Table 1 and 2 that the disadvantage peculiar to the prior-art spur is solved by one or more ranks.

In the data of the prior art shown in Table 2, a good result is obtained if use is made of a spur having an angle of contact of 110° or greater at a normal temperature of 50%RH, and this is considered to be because viscosity has increased just at a level whereat the ink has begun to be fixated and the force with which the ink adheres to the recording medium has become a little stronger in the aforedescribed principle.

It is not because of the aforedescribed principle, but because the ink has already been dried by super-low humidity and no longer causes its transfer that the results are all OK under a low humidity of 10%RH.

Also, Table 3 shows a test in which the surface roughness of the spur has been varied in the embodiment according to the system of the present invention, and here, for the sake of convenience, the numerical values at Rmax are used as parameters, but again, smaller surface roughness results in good sliding and reduced resistance and therefore, the force with which the ink is dragged down may be small, and this is better. The surface roughness differs in its shape from material to material although equal in numerical value, and particularly whether the surface roughness is good or bad is determined by the combination thereof with the adhering force provided by the water-repelling property.

Table 4 shows the variations by the angle formed by the spur with respect to the printing surface, and again, an angle as approximate as possible to vertical with respect to the printing surface has led to a good result. This is because a stripping-off force is applied in a direction perpendicular to the printing surface when the ink is dragged down from the spur, and it is proved that greater ease with which the force in this direction is applied leads to a better result.

Figure 4:
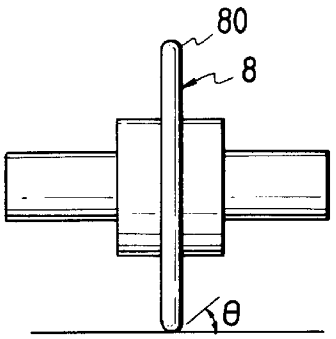
FIGS. 4 and 5 and FIGS. 6 and 7 are front views and side views, respectively, of further embodiments of the present invention.
Figure 5:
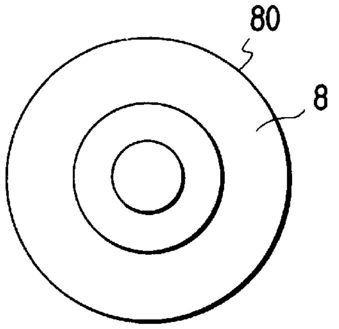
Figure 6:
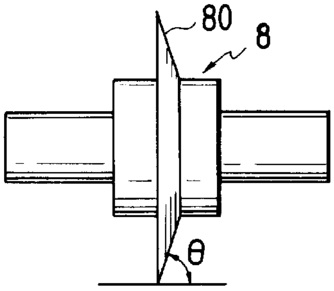
Figure 7:
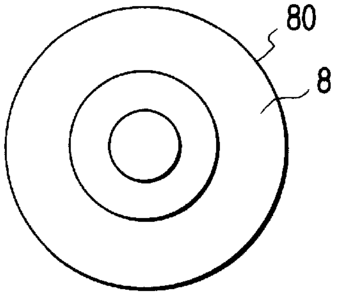

FIGS. 4 and 5 showing a member whose peripheral surface is semicircular ($\theta$ can be regarded as 45°) and FIGS. 6 and 7 showing a member which can be regarded as a half that of FIG. 2 show further embodiments of the present invention. In both of these embodiments, the peripheral surface continuously bears against the surface of the recording medium, and so far as this is concerned, the peripheral surface need not be circular, but may be polygonal or elliptical or of an indefinite shape such as a belt-like shape, and in short, the peripheral surface can be of a continuous shape in which it is continuous without the contact thereof with the ink being discontinued near the point of contact therebetween.

As described above, by using a paper conveying member whose peripheral surface is of such a shape that it continuously contacts with the printing surface, the effect of greatly preventing print stains such as spur traces even in the case of a compact portable type printer, or even during printing of high printing proportion on plain paper or even under a bad environment such as high humidity has become possible from a simple principle and construction.

Reference is now made to FIGS. 11 to 19 to describe an invention further improved over the above-described invention.

The above-described embodiments are ones in which the conveying property is improved and the spur trace is greatly prevented, but if the width of contact of the spur with the printing surface is increased for the conveying force and the durability up, even if said width of contact is within a range which will not permit a spur trace to appear, it has sometimes been the case with an apparatus for highly detailed graphics of 180 dpi or 300 dpi or more that because half-tone printing is often used in such apparatus, when half-tone printing of printing duty (density) of less than 50%–100% is effected under high humidity in which the ink is difficult to fixate, image smearing is much smaller than in the prior art but a slightly conspicuous black streak-like half-tone portion occurs after the spur has passed. However, in practice, such a fear has been small in an apparatus wherein the quality of printing is as low as 180 dpi or less or character printing or solid printing is main. However, it has also been experienced that if the width of contact of the spur with the recording medium is made still greater, the ink on the spur is transferred only at one point onto the spur only in the boundary line along which the spur passes from a solid black portion to the non-printing portion, and a small image stain is produced only at one point by the next contact of the spur at that point.

This poses no problem in ordinary printing, but we have found that it should be solved when an ink record is to be obtained like a photograph. The invention which achieves this is as follows. In a paper feeding member which bears against the recording medium and rotates, design is made such that the peripheral surface thereof continuously bears against the recording medium and the width thereof in the direction of its rotational axis 0.1 mm inward of the peripheral surface is 1.0 mm or less, preferably 0.7 mm or less, whereby it is made possible to prevent the ink on the surface of the recording medium from being transferred onto solid black, as well as to prevent the ink on the boundary line between the solid black portion and the non-printing portion from being transferred onto the spur. Thereby, the compatibility of the conveyance property and printing which will produce no spur trace is made possible.

Basically, when the spur contacts the ink, the balance of power with which the ink does or does not adhere is determined by the bonding power between the spur and the ink, the bonding power between the ink and the paper and the cohesive power by the surface tension of the ink itself, and the characteristic of this balance of power is utilized. It has been found in the present invention that by using a shape in which even the width of the spur is prescribed as in the present invention, the force with which the ink adheres to the spur when the spur moves is made so as to become always lower in any case, whereby complete non-transfer of the ink to the spur can be achieved.

As regards the definition of the width of the rotational member of the present invention, the recording medium such as paper and this rotational member are microscopically deformed in a state in which they are in contact with each other by pressure applied thereto, and the definition becomes indefinite as to also a spur whose end surface is originally R-shaped and therefore, the width is defined by the width in the cross-section passing the rotational axis 0.1 mm inward from the peripheral surface which bears against the recording medium.

If based on this condition, in FIGS. 2 and 6, the contact is substantially the contact by the edge and therefore the width of contact is a thin line of 1 mm or less and thus, the spurs of FIGS. 2 and 6 are covered by the present invention and can be regarded as embodiments of the present invention.

Figure 16:
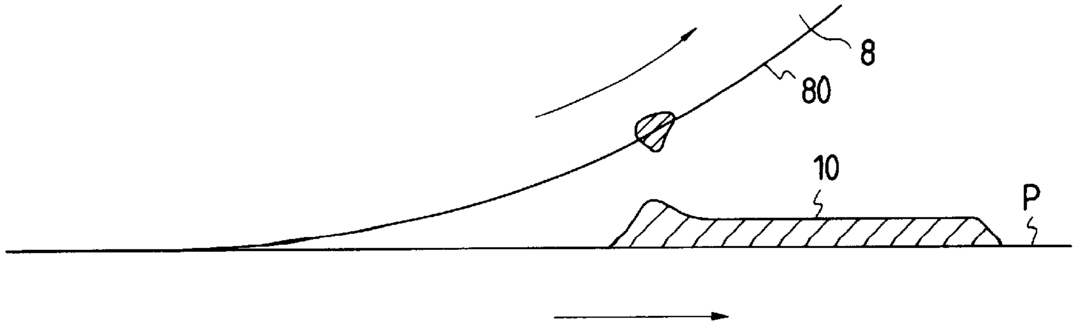
FIG. 16 shows the state of transfer of ink to the surface of a spur in the embodiment of FIG. 17.
Figure 17:
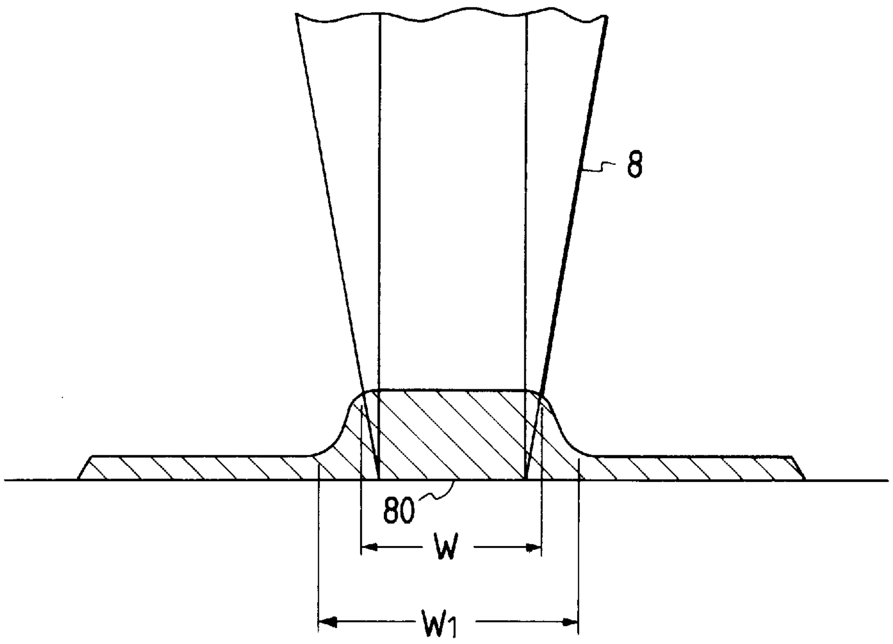
FIG. 17 shows a spur having a great width of contact as it is seen in the direction of movement of the recording medium.
Figure 18:
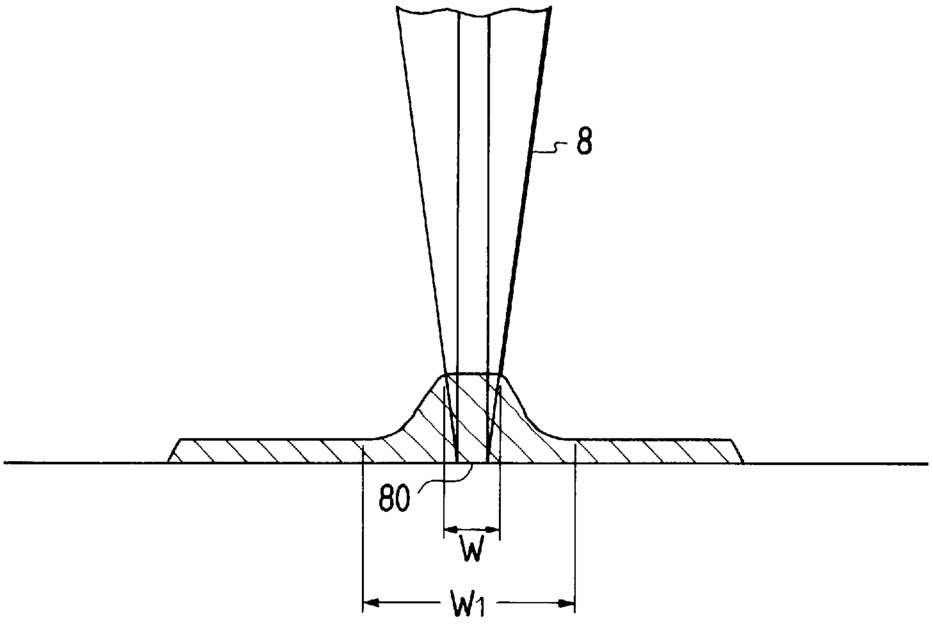
FIG. 18 illustrates an embodiment of the best mode of the present invention which solves the problem of FIG. 15.

Now, the production of the above-described spur trace only at one point will be described briefly with reference to FIGS. 15, 16 and 17.

Figure 15:
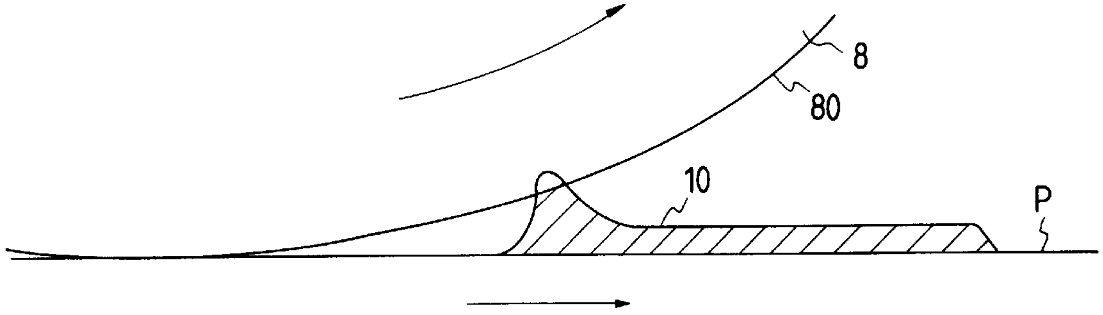
FIG. 15 shows the state of ink adhering to the surface of a spur after it has passed a black solid portion newly created even when the spurs of the embodiments of FIGS. 2 to 7 are used.

Even in the case of a spur whose peripheral surface continuously bears against the recording medium, in the edge portion of the solid black portion, the states of the ink and the spur 8 are as shown in FIG. 15. From this point of time, the restrained area between the ink and the paper decreases extremely with the rotative conveyance and thus, the aforedescribed balance of power begins to be destroyed only at this point and the ink is transferred only to one point on the peripheral surface of the spur, as shown in FIG. 16. We have found the dynamic relation that even in that case, if the width W of the spur is as narrow as 1 mm or less, the spur and the point of restraint in the widthwise direction of that portion of the spur which is adjacent to the ink are originally very narrow in the state shown in FIG. 18 and therefore the ink is not transferred to the spur even if the restrained area of the recording medium in the direction of movement thereof is decreased. Conversely, if the width W exceeds 1 mm, the proportion of the restrained area of the spur in the widthwise direction thereof is great as shown in FIG. 17 and therefore, the ratio between the restrained area of that portion of the recording medium which is adjacent to the ink and the restrained area of that portion of the spur which is adjacent to the ink is small, and the ink at this point is transferred at one point onto the spur, and at the next point of contact by the rotation of the spur, the ink is transferred at one point onto the recording medium. $W_1$ indicates the width of restraint between the surface of the recording medium and the ink.

Table 5 below shows a test in which in the case of a spur having the shape of FIG. 2 and having an angle of 80° formed by the tapered portion with respect to the printing surface, the contact pressure to the surface of the paper has been set to 20 g and samples differing in the width of the end have been home-fed immediately after a solid black line has been printed under environments differing in humidity, to thereby examine whether said one point of spur trace has appeared.

TABLE 5

| | Width W | | | | |
|---|---|---|---|---|---|
| Humidity | 2 mm | 1.0 mm | 0.7 mm | 0.3 mm | 0.1 mm |
| 25° C./98% RH | NG | More or less | OK | OK | OK |
| 25° C./50% RH | NG | OK | OK | OK | OK |
| 25° C./10% RH | OK | OK | OK | OK | OK |

As can be seen from Table 5, the production of said one point of spur trace could also be prevented by selecting the width W of the spur 8 of the above-described shape to 1.0 mm or less, optimally 0.7 mm or less. We have confirmed that under this condition of the width W, i.e., 0.7 mm or less, those within a preferable range under the conditions of Tables 1, 3 and 4 shown above are optimum, and have also confirmed that a good result in practical use can be obtained even if the angle θ of Table 4 is made small (e.g. 30°). We have likewise confirmed that for a width of 0.7 mm or less, the condition of the water repelling property can be alleviated.

It is considered to be because the ink image is considerably fixated that the production of said one point of spur trace is not seen at said 25° C./10%RH.

Preferred examples of the material having a high water-repelling property include tetrafluoroethylene resin, parfluoro-alkoxy resin, propylene hexafluoride copolymer resin, tetrafluoroethylene-ethylene copolymer resin, vinylidene fluoride resin and ethylene chloride trifluoride resin which are fluorine compound materials generally used, polymers such as high-density polyethylene, polyethylene, polypropylene, trimethyl pentene, polyacetal, nylon, polysulphone and phenol, and members having their surfaces coated with those polymers. Basically, the choice among these materials is determined with the water-repelling property, the ink-resisting property, abrasion and deformation strength being additionally taken into account.

Figure 11:
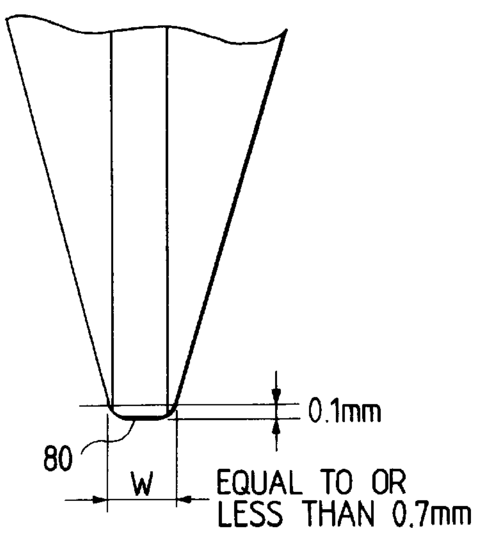
FIGS. 11 and 12 and FIGS. 13 and 14 are front views and side views, respectively, of further embodiments of the present invention.
Figure 12:
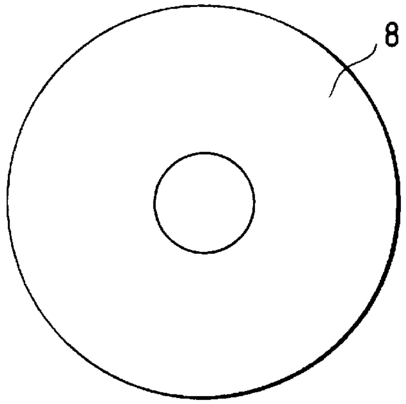
Figure 13:
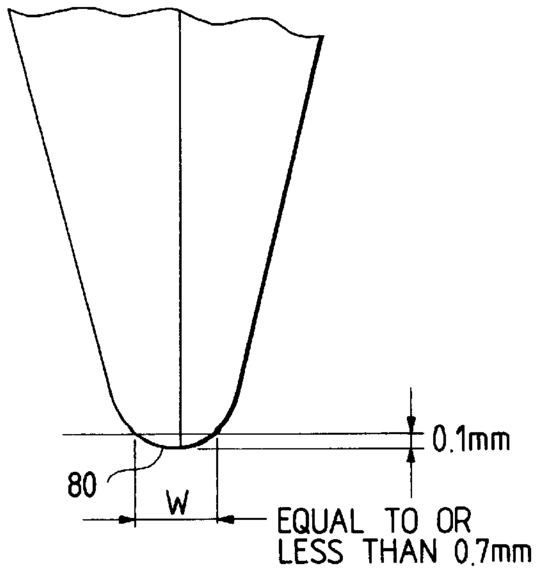
Figure 14:
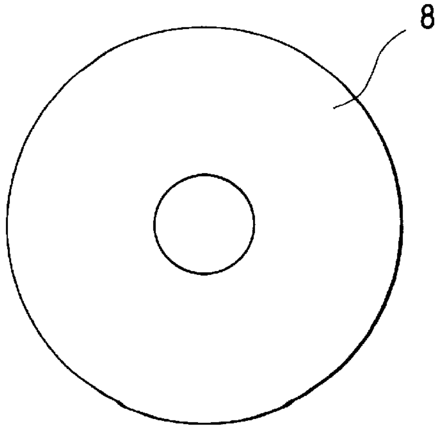

FIGS. 11 and 12 and FIGS. 13 and 14 show further embodiments of the present invention. FIGS. 11 and 12 are enlarged views of the end portion, FIG. 11 showing a spur of which the corner portion is R-shaped. FIG. 12 shows a spur of a shape equivalent to an R-shape including the surface of contact. Any of these figures shows the end portion of a spur whose peripheral surface continuously bears against the surface of the recording medium and whose width is 0.7 mm, and as far as this is concerned, the peripheral surface need not be circular, but may be polygonal or elliptical or of an indefinite shape such as a belt-like shape, and in short, the peripheral surface can be of a continuous shape in which it is continuous without the contact thereof with the ink being discontinued near the point of contact therebetween.

Also, in an apparatus which is high in quality of image and in which print stain is unacceptable, the spur of the present invention is best suited, and in an apparatus wherein more or less stain is acceptable, the spur of the invention previously described with reference to FIGS. 1 to 9 can be said to be best suited from the viewpoint of durability or the like. In any case, the present embodiment exhibits a considerably better level than the previously described invention.

As described above, by using a paper conveying member whose peripheral surface is of such a shape that it continuously contacts with the printing surface and in which the width in the direction of the rotational axis 0.1 mm inward from the peripheral surface is optimally 0.7 mm or less, the effect of entirely preventing print stains such as spur traces even in the case of a compact portable type printer, or even during printing of high printing proportion on plain paper or even under a bad environment such as high humidity has become possible from a very simple principle and construction.

Figure 19A:
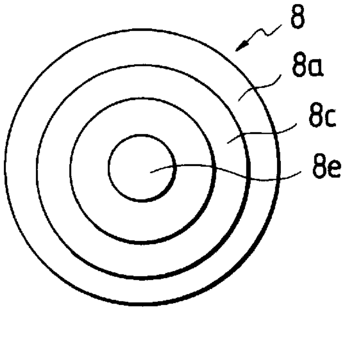
FIGS. 19A and 19B are a front view and a side view, respectively, of a spur.
Figure 19B:
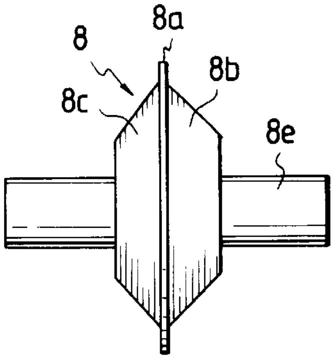
Figure 20:
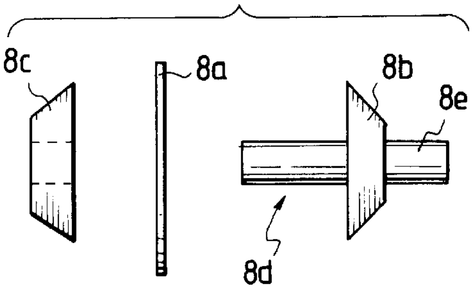
FIG. 20 illustrates the disassembled construction of the spur of FIG. 19.
Figure 21:
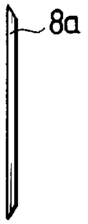
FIG. 21 illustrates a partial modification of the FIG. 20 embodiment.

Reference is now had to FIGS. 19 to 21 to describe an embodiment in which the conveying member 8 is constructed simply and durability can be improved by only the replacement of parts. The feature of this embodiment is that a rotational member whose peripheral surface continuously contacts with the recording medium is constituted by a film member having a water-repelling property.

This embodiment, in which the rotational member is constituted by a film member having a water repelling property, has the advantage that the working process can be simplified and mass production of rotational members is made possible by press working of good productivity. Also, the mass production can be accomplished by minimally using the expensive water-repelling member and therefore, a lower cost can be realized.

FIGS. 19A and 19B are a front view and a side view, respectively, of a spur, and FIG. 20 is an illustration showing the disassembled construction of the spur.

The spur 8, as shown in FIG. 20, is comprised of a ring *8a* provided by press-working a water-repellent member such as tetrafluoroethylene film into a ring shape, a molded member *8d* of polyethylene, polyacetal or like material comprising a shaft *8e* and a guide ring *8b* for the ring *8a* molded integrally with each other, and a guide ring *8c* for the ring *8a*, the molded member *8a* and the guide ring *8c* being integrally mounted on both sides of the ring *8a*.

The spur 8, as shown in FIGS. 19A and 19B, is of a shape in which the peripheral surface portion of the ring *8a* and the vicinity thereof protrude a little from the peripheral surface portions of the guide ring *8b* and the guide ring *8c*. The peripheral surface portion of the ring *8a* continuously bears against the recording medium P, and the spur 8 rotates freely with the discharge of the recording medium P.

According to an experiment, when polytetrafluoroethylene (PTFE) film and tetrafluoroethylenefluoro-alkoxyethylene copolymer (PFA) film each having a thickness of 200 μm were used, there could be obtained a spur 8 good in strength and conveyance property when the ring *8a* was brought into contact with the recording medium P with the outer diameter of the ring *8a* protruding by 0.25 mm from the outermost diameters of the guide ring *8b* and the guide ring *8c*. If the outer diameter of the ring *8a* protrudes by more than 0.25 mm, flexure will occur to the film and therefore, the amount of protrusion may preferably be 0.25 mm or less. The avoidance of a case where due to deformation such as wrinkling occurring to the recording medium P, the printing surface directly contacts with the guide ring 8*b* and the guide ring 8*c* to thereby stain the latter is the lower limit of the difference in the amount of protrusion.

When recording was carried out by the use of the spur 8 with the environmental humidity and the angle of contact of the spur with the ink varied, there was obtained an effect similar to that described previously.

Next, the thickness of the film of the ring 8*a* constituting the spur 8 is determined by the degree of image deterioration after the printing surface of the recording medium P has passed the spur 8 during the unfixation of the ink when half-tone printing is effected.

As a method of this test, the thickness of the film of the ring 8*a* was determined by passing the spur 8 on the printing surface immediately after half-tone printing having an ink discharge proportion of 50%, relative to solid black printing in which the ink is full-dot-discharged by 100%, has been effected, and measuring the degree of the image deterioration caused by the blur of the ink on the printing surface by the spur 8. According to the above-described experiment, it has been found that when the thickness of the film is 300 $\mu$m or less, the quality of image can be maintained, and when the thickness of the film exceeds 300 $\mu$m, image deterioration becomes slightly conspicuous. Even in these cases, the film is not always unusable.

In the case of this embodiment, it is considered to be because the vibration of the film 8*a* itself in the direction of flexure during the conveying rotation thereof is slightly occurring that the condition for obtaining a high quality of image is the thickness of 300 $\mu$m or less. In any case, again in such a construction, the above-described effect could be reliably obtained owing to the fact that in the construction of FIG. 18, the width of contact so referred to herein is 300 $\mu$m or less.

The ring 8*a* shown in FIG. 21 is such that the vicinity of the peripheral surface portion of tetrafluoroethylene film is formed into a thinner tapered shape toward the peripheral surface portion. The method of working said film is to cause the vicinity of the peripheral surface to be composition-deformed into a tapered shape under a warm condition or a cold condition by a press, and punching it into a ring shape by the next press to thereby obtain the ring 8*a* as shown.

The vicinity of the peripheral surface portion of the ring 8*a* is thus formed into a thin wall and therefore, even if the spur bears against the recording medium P, it becomes difficult for a spur trace to appear on the recording medium, and the other portion than the vicinity of the peripheral surface can be increased in thickness and therefore in strength.

While this ring 8*a* is formed into one-side taper, the ring 8*a* can also be formed into both-side taper.

Reference is now had to FIGS. 22 to 26 to describe an ink jet recording apparatus which can effect back feed in which the recorded surface of a recording medium is caused to pass again a recording area opposed to a recording head.

Again in the back feed, image disturbance is caused by the conveying member which contacts with the recording surface and therefore, this embodiment is common to the aforedescribed embodiment in the solution to problems.

The back feed is effected not immediately after recording, but after the lapse of a predetermined time and therefore, it is difficult for the above-noted problem to arise in a recording system such as the wire dot system or the heat transfer system, and this can also be said to be a problem peculiar to an ink jet recording apparatus for discharging liquid ink to thereby accomplish recording.

This embodiment prevents the recording surface from being stained by the recording medium being conveyed in the direction opposite to the main scanning direction and rubbing against a conveyance guide or a conveying roller when so-called back feed is effected.

The invention which will hereinafter described with reference to FIGS. 22 to 26 is an ink jet recording apparatus which is provided with an ink jet recording head having an ink tank for containing ink therein and discharging the ink supplied from said ink tank and in which ink droplets are discharged from said recording head to a recording medium to thereby accomplish recording, characterized in that spurs whose peripheral surface is of a rotational shape in which it continuously bears against the recording medium are disposed forwardly and rearwardly in the direction of conveyance of the recording medium. According to the present embodiment, there can be provided an ink jet recording apparatus in which there is no limitation in the direction of conveyance immediately after recording and which has a variety of recording modes.

Another invention which solves the previously noted problem is an ink jet recording apparatus characterized in that spurs whose peripheral surface is of a rotational shape in which it continuously bears against a recording medium are disposed forwardly and rearwardly in the direction of conveyance of the recording medium, and conveyance guide means for preventing the recording medium from contacting with a conveyance guide in a state in which the recording medium has been set in the recording apparatus is provided in a conveying system wherein the conveyance guide is disposed on the recording surface side of the recording medium. According to this construction, even if irrespective of the direction in which the recording medium is conveyed and scanned, for example, back feed is effected in the ink jet recording apparatus, it becomes possible to prevent the problem of disturbing recorded images by unfixated ink.

Still another invention is an apparatus which solves the problem that if the spur of the present invention is applied to a spacer roller for maintaining a gap between a recording head and a recording medium and is disposed in contact with the recording medium immediately after recording, the roller itself may be stained or the image may be disturbed, and can form a gap reliably. This apparatus has the advangage that even if the thickness of the recording medium fluctuates variously, any minute variation in the recording gap can be followed up and therefore the quality of recorded image can be made higher than before. This apparatus also displays an excellent effect for full color recording by superposed printing of a plurality of colored inks of which a high quality of image is required.

Figure 22:
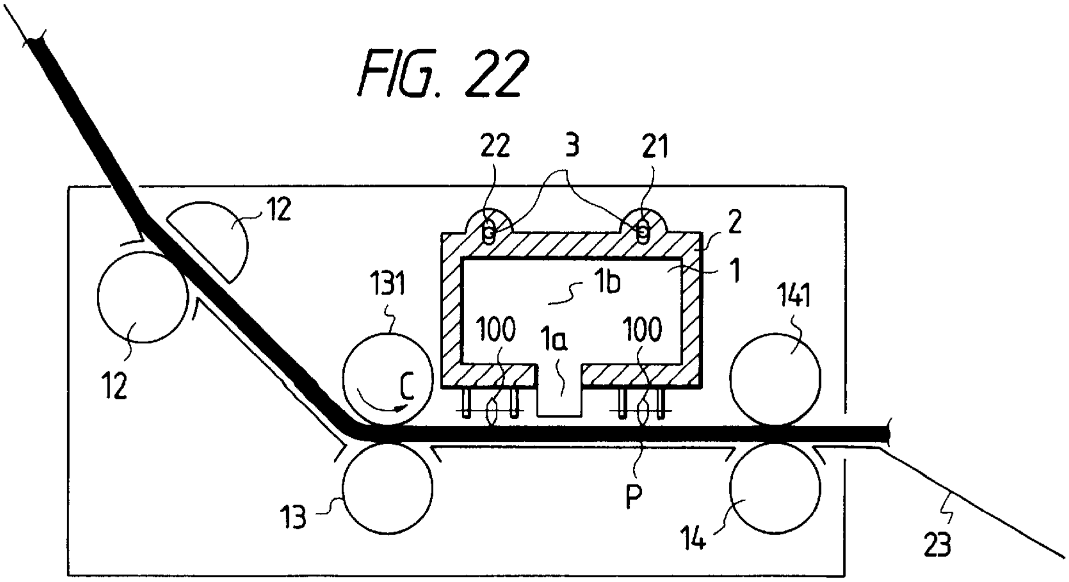
FIG. 22 illustrates a recording apparatus according to a first embodiment of the back feed system invention.

FIG. 22 illustrates a recording apparatus of the ink jet type.

A recording head cartridge 1 and carriage guide shafts 3 are the same as those described in connection with FIG. 1, while a carriage 2 is displaceable relative to the guide shafts 3 with spacer rollers 100 for maintaining the recording gap constant. In the present embodiment, the carriage has slots 21 and 22 perpendicular to the guide shafts 3 and is made displaceable so that the recording gap may be constant even if the thickness of a recording medium P varies. The spacer rollers 100 are fixed to the carriage 2 for rotation in the scanning (sub-scanning) direction of the carriage, and are disposed in proximity to a recording head 1*a*. In the present embodiment, the spacer rollers 100 are provided on both sides of the head 1*a,* but alternatively, a spacer roller 100 may be provided only on one side of the head 1*a*. The displacing mechanism for the carriage is not limited to the present embodiment, but any conventional one may be applied. The spacer rollers 100 are the spurs 8 in the afore-described embodiments of the present invention and therefore can maintain the recording gap highly accurately without disturbing images. In the conveyance of the recording medium after recording toward the tray 23, the effect of a roller 141 by the structure of the spur 8 is as previously described. The reference numeral 12 designates a pair of partly cut-away paper feed rollers, the reference numerals 13 and 131 denote a pair of spur conveying rollers of which the recording surface side roller 131 is a spur 8, and the reference numerals 14 and 141 designate a pair of spur paper discharge rollers of which the recording surface side roller 141 is a spur 8. P denotes a recording medium.

The operation of the above-described construction will now be described. In FIG. 22, the recording medium P is fed by the pair of paper feed rollers 12 and is set as shown in FIG. 22, whereafter the cartridge 1 provided with the recording head 1*a* effects one-line recording on the recording medium P by the movement of the carriage 2 in the sub-scanning direction. Subsequently, the pair of spur conveying rollers 13 and 131 are rotated in the forward direction (the direction of arrow C), whereby the recording medium is conveyed in the main scanning direction.

When in the above-described apparatus, the pair of spur conveying rollers 13 and 131 are rotated in the reverse direction and back feed is effected, the unfixated ink on the recording medium may be rubbed by the roller to disturb images, but in the present embodiment, the rollers are constructed of said spurs and therefore, no image disturbance is caused.

That is, even when back feed is effected and the spurs contact with the unfixated ink, balance is kept by the surface bonding power between the spurs and the ink, the bonding power between the ink and the recording medium and the cohesive power of the ink itself so that the force with which the ink adheres to the spurs may always be lower and therefore, non-transfer of the ink to the spurs is achieved and no image disturbance is caused.

By the utilization of the fact that the principles of transfer and non-transfer of the ink to the spurs are independent of the scanning direction of the recording medium, spurs 8 (for example, counters of an abacus) whose peripheral surface is of a rotational shape in which it continuously bears against the recording medium are disposed forwardly and rearwardly in the direction of conveyance of the recording medium, whereby irrespective of the scanning direction of the recording medium, it becomes possible to prevent the unfixated recording surface from being rubbed to thereby cause the disturbance of recorded images.

During one-line feeding of the recording medium in the main scanning direction, the spacer rollers 100 disturb images and for this reason, as in the prior art, the carriage can be moved to the home position (the standby position far from the recording area). If such movement is not effected, the carriage may be retracted so that the spacer rollers may be separated from the medium.

Description will now be made of an embodiment in which, in the conveying system wherein a conveyance guide is disposed on the recording surface side of the recording medium, the recording medium does not contact with the conveyance guide in a state in which the recording medium has been set in the recording apparatus.

Means constructed so as not to rub against the recording surface will hereinafter be described.

Figure 23:
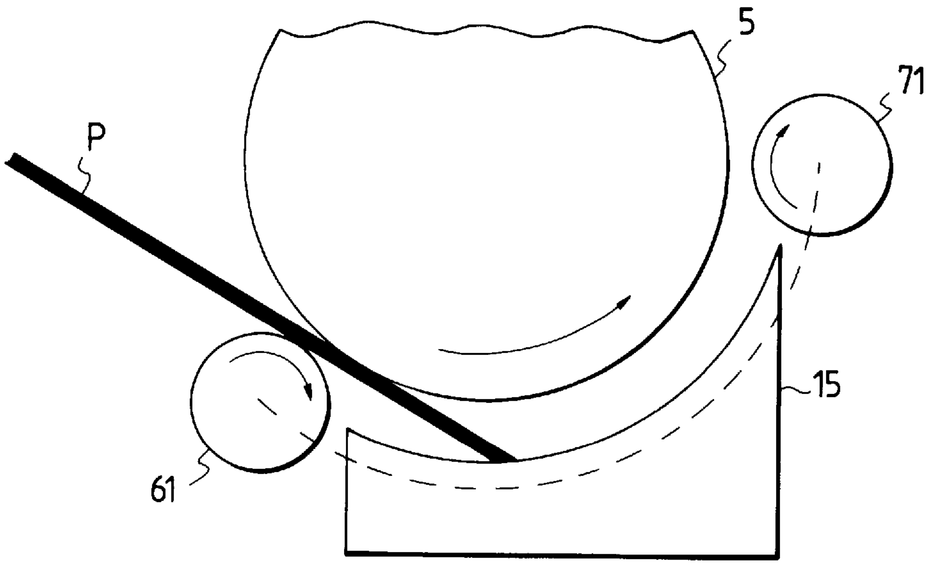
FIGS. 23, 24 and 25 illustrate the setting of a recording medium according to a second embodiment of the back feed system invention.
Figure 24:
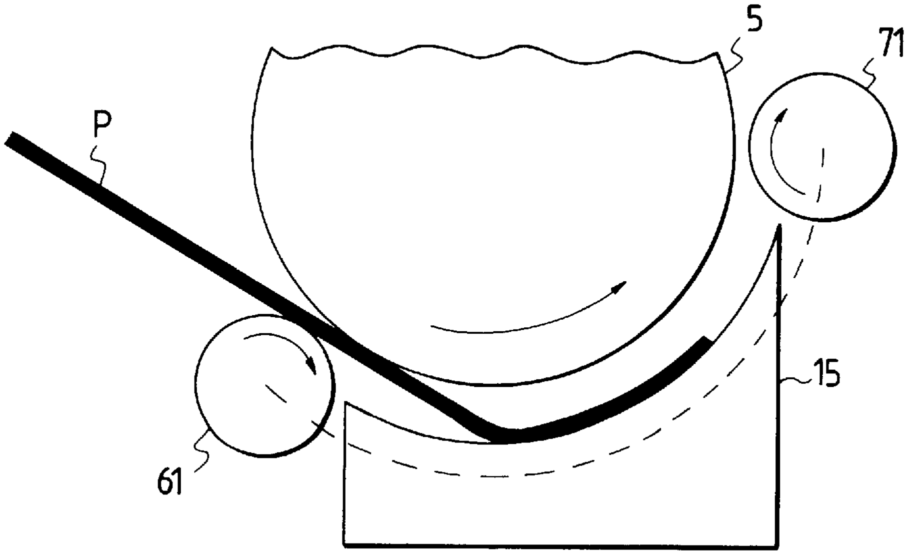
Figure 25:
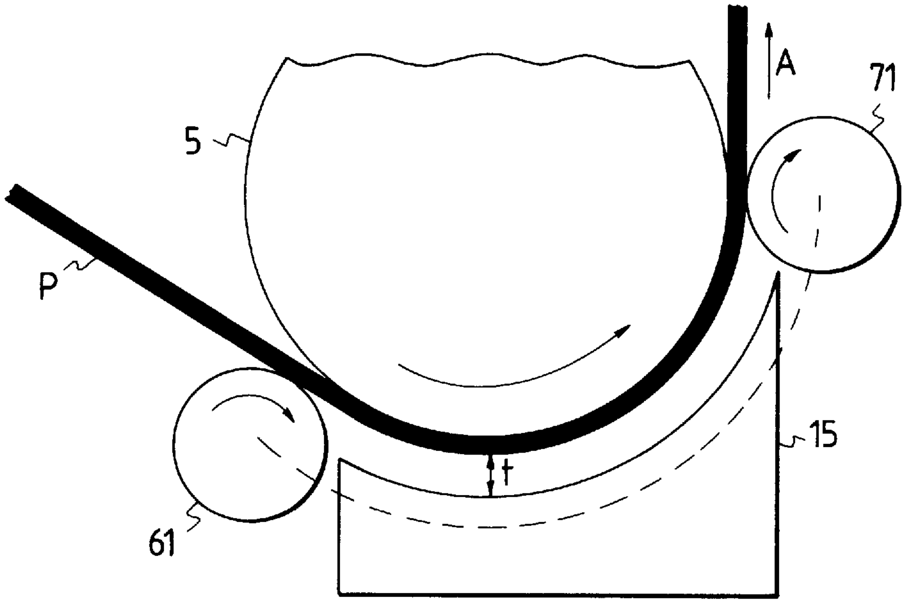

FIGS. 23, 24 and 25 illustrate the manner in which the recording medium is set.

As shown in FIG. 23, when the recording medium P is fed, the leading end edge thereof first strikes against the conveyance guide 15, and is conveyed along the conveyance guide 15, as shown in FIG. 24. The leading end edge of the recording medium P strikes against a spur 8 type paper keeper 71 and is bitten thereby, and is conveyed in the direction of arrow A as shown in FIG. 25.

Then the leading end edge of the recording medium is nipped by and between a spur 8 type paper discharge roller 8 and a receiving roller 9.

Here, in the recording apparatus according to the present embodiment, the conveying force between the platen roller 5 and the conveying rollers 61, 71 is greater than the conveying force between the paper discharge roller 8 and the receiving roller 9, and the recording medium conveying speed of the platen roller 5 is lower than the conveying speed of the paper discharge roller 8. That is, the force with which the recording medium P is conveyed and the speed at which the recording medium P is conveyed are controlled by the platen roller 5, and the paper discharge roller 8 is rotating at a high speed while slipping for the purpose of keeping the recording medium P tensioned. The technique of intentionally making the recording medium conveying speed different between the rollers conveying the recording medium is a known technique and therefore need not be described in detail herein.

In the present embodiment, when the recording medium P is fed and bitten by the paper discharge roller 8, the slack in the recording medium P between the platen roller 5 and the conveyance guide 15 is absorbed because the conveying speed of the paper discharge roller 8 is higher than the conveying speed of the platen roller 5, and thus there is formed a gap t between the recording medium P and the conveyance guide 15 as shown in FIG. 25.

By such gap being formed, it becomes possible to prevent the recording surface of the recording medium P being rubbed by the conveyance guide 15 even when back feed is effected.

The spur roller type paper keepers 71 and 61 are spurs which are used as paper discharge rollers and whose peripheral surface is of a rotational shape in which it continuously bears against the recording medium and therefore, the recording surface is neither stained nor disturbed by the spur roller type paper keepers 71 and 61.

In the above-described embodiment, contact is prevented by providing a gap t between the recording medium P and the conveyance guide 15 as shown in FIG. 25. To increase the reliability of the prevention of contact, the gap t may preferably be as wide, as possible. However, if the gap t is wide, the angle of plunge of the leading end edge of the recording medium into the spur roller type paper keeper 71 and 61 during paper feed will change and the impact of plunge will increase.

It is because the peripheral surface of the spur roller type paper keepers 71 and 61 is of a shape in which it can continuously bear against the recording medium that the ink will not be transferred even if the spur roller type paper keepers 71 and 61 bear against unfixated recorded images, and the spur function of preventing the transfer of the ink will be reduced if flaws or breakage are formed on the peripheral surface by the leading end edge of the recording medium.

Also, a paper discharge roller using a spur is used while being caused to rotate and slip at a speed higher than the conveyance speed of the recording medium and therefore, the peripheral surface thereof suffers from severe abrasion.

Figure 26:
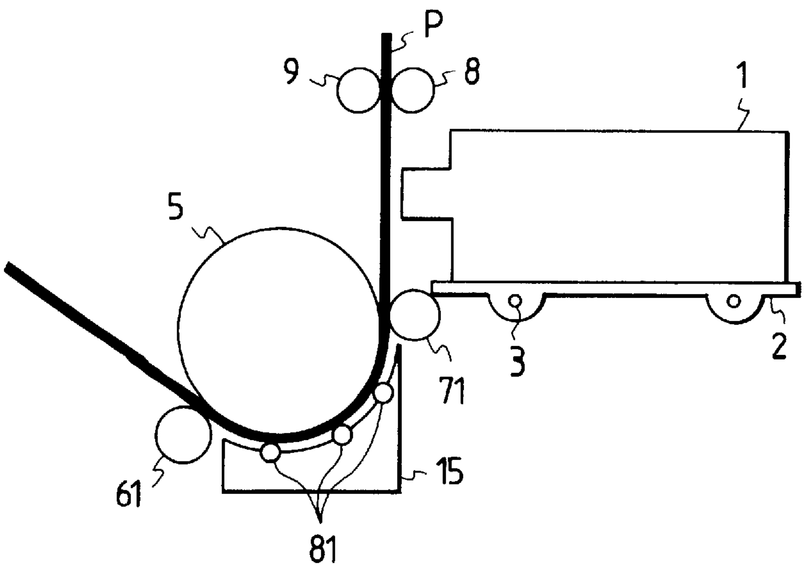
FIG. 26 illustrates a conveyance guide according to a third embodiment of the back feed system invention.

FIG. 26 shows an embodiment suitable for kinds of machines of which a great number of durable sheets is required. In this embodiment, in addition to the construction of FIGS. 23 to 25, guide spurs 81 are disposed as the aforedescribed spurs of the present invention on the surface of the conveyance guide 15 which guides the recording medium P. Thus, 1) the recording surface of the recording medium P is supported by the guide spur 81 and does not directly contact with the guide surface of the conveyance guide 15;
2) the gap between the platen roller 5 and the conveyance guide 15 can be narrowed to the necessary minimum and therefore, during paper feed, the impact of plunge of the leading end edge of the recording medium P against the spur roller type paper keeper 71 can be minimized; and
3) during paper feed, the recording medium P has no slack between the platen roller 5 and the conveyance guide 15 and therefore, the paper discharge roller 8 which is a spur need not be used while being caused to rotate and slip at a speed higher than the conveyance speed of the recording medium P.

Consequently, in the present embodiment, the frequency with which impediments such as abrasion, flaws and breakage of the paper discharge roller 8 which is a spur and the spur roller type paper keeper 71 occur can be decreased and therefore, high durability can be achieved.

Also, in the present embodiment, the number of the guide spurs 81 is three, but the number of the guide spurs 81 may be more or less than three.

As regards the kinds or number of the recording heads carried on the carriage, for example, only one head may be provided correspondingly to monochromatic ink and besides, provision may be made of a plurality of heads differing in recording color or density.

The inventions of FIGS. 23 to 26 are such that as previously described, in the construction wherein spurs whose peripheral surface is of a rotational shape in which it continuously bears against the recording medium are disposed forwardly and rearwardly in the direction of conveyance of the recording medium and a conveyance guide is disposed on the recording surface side of the recording medium, provision is made of conveyance guide means for preventing the recording medium from contacting with the conveyance guide in a state in which the recording medium has been set in the recording apparatus, whereby even if irrespective of the conveyance and scanning direction of the recording medium, for example, back feed is effected in the ink jet recording apparatus, it becomes possible to prevent the problem of recorded images being disturbed by unfixated ink.

The peripheral surface of the spur need not be circular, but may be polygonal or elliptical or of an indefinite shape such as a belt-like shape, and in short, the peripheral surface need only be continuous without the contact thereof with the ink being discontinued near the point of contact.

The present invention can more enhance the above-described operational effect by the combined effect of the fixation expediting effect of heat energy and the effect of said spur in a recording head and a recording apparatus of the bubble jet type proposed by Canon, Inc., particularly among the ink jet recording systems.

The typical construction and principle of it may preferably be based on the basic principle disclosed, for example, U.S. Pat. Nos. 4,723,129 and 4,740,796. This system is applicable to both of the so-called on-demand type and the so-called continuous type, and particularly in the case of the on-demand type, it is effective because at least one driving signal corresponding to recording information and providing a rapid temperature rise exceeding nucleate boiling is applied to an electro-thermal converting member disposed corresponding to a sheet or a liquid path in which liquid (ink) is retained, whereby heat energy is generated in the electro-thermal converting member to cause film boiling on the heat-acting surface of a recording head, with a result that a bubble corresponding at one to one to this driving signal can be formed in the liquid (ink). By the growth and contraction of this bubble, the liquid (ink) is discharged through a discharge opening to thereby form at least one droplet. If the driving signal is made into a pulse-like form, the growth and contraction of the bubble will appropriately take place on the spot and therefore, discharge of the liquid (ink) especially excellent in responsiveness can be accomplished, and this is more preferable. This driving signal in the pulse-like form may suitably be one as described in U.S. Pat. No. 4,463,359 or U.S. Pat. No. 4,345,262. Also, more excellent recording can be accomplished if the conditions described in U.S. Pat. No. 4,313,124 which discloses an invention relating to the rate of temperature rise of said heat-acting surface are adopted.

As the construction of the recording head, besides the construction comprising a combination of discharge ports, liquid paths and electro-thermal converting members as disclosed in each of the above-mentioned patents (straight liquid flow paths or right-angled liquid flow paths), the construction using U.S. Pat. Nos. 4,558,333 and 4,459,600 which disclose a construction in which a heat-acting portion is disposed in a crooked area is also covered by the present invention. In addition, the present invention is also effective if it adopts a construction based on Japanese Laid-Open Patent Application No. 59-123670 which discloses a construction in which a slit common to a plurality of electro-thermal converting members is the discharge portion of the electro-thermal converting members or Japanese Laid-Open Patent Application No. 59-138461 which discloses a construction in which an opening for absorbing the pressure wave of heat energy corresponds to the discharge portion.

Further, the recording head of the full line type having a length corresponding to the width of the largest recording medium on which the recording apparatus can effect recording may be of a construction in which said length is satisfied by a combination of a plurality of recording heads as disclosed in the aforementioned publications or a construction as a single recording head formed as a unit, and the present invention can display the above-described effect more effectively.

In addition, the present invention is also effective when use is made of a recording head of the interchangeable chip type of which the electrical connection to the apparatus body and to which the supply of ink from the apparatus body becomes possible by being mounted on the apparatus body, or a recording head of the cartridge type in which a cartridge is provided integrally with the recording head itself.

Also, the addition of recovery means for the recording head, preliminary auxiliary means, etc. provided as the construction of the recording apparatus of the present invention can more stabilize the effect of the present invention, and this is preferable. Specifically mentioning these, they include capping means for the recording head, cleaning means, pressing or suction means and preheating means comprising an electro-thermal converting member or a heating element discrete therefrom or a combination of these, and carrying out the preliminary discharge mode in which discharge discrete from that for recording is effected is also effective to accomplish stable recording.

Further, the recording mode of the recording apparatus is not limited to the recording mode of the main color such as black, but may use a recording head constructed as a unit or a combination of a plurality of recording heads, and the present invention is also very effective for an apparatus provided with at least one of a plurality of different colors and full color by mixed colors.

In the above-described embodiments of the present invention, the ink has been described as liquid, but the ink may be ink which solidifies at room temperature or below and softens or liquefies at room temperature, or ink which assumes the liquid phase when the recording signal used is imparted, because in the above-described ink jet, it is usual to temperature-regulate ink itself within the range of 30° C. to 70° C. to thereby effect temperature control so that the viscosity of the ink may be within a stable discharge range. In addition, the temperature rise by heat energy may be used as energy for the phase change of the ink from the solid phase to the liquid phase to thereby prevent such temperature rise, or ink which solidifies when left as it is may be used to prevent the evaporation of the ink, and in any case, the use of ink having the nature that it is liquefied only by heat energy, such as ink which is liquefied by the application of heat energy conforming to a recording signal and is discharged in the form of ink liquid, or ink which already begins to solidify at a point of time whereat it arrives at the recording medium, is also applicable to the present invention. In such a case, the ink may be in a form opposed to an electro-thermal converting member while being retained as liquid or solid in the recesses or through-holes of a porous sheet, as described in Japanese Laid-Open Patent Application No. 54-56847 or Japanese Laid-Open Patent Application No. 60-71260. In the present invention, what is most effective for each kind of ink described above is what executes the above-described film boiling system.

We claim:

1. An ink printer for printing on an ink bearing medium using a liquid ink, said printer comprising:

at least one rotatable member arranged in a region of a transport path of the ink bearing medium, said rotatable member being contactable with the ink bearing medium at regions thereof upon which the ink has been deposited, wherein said rotatable member includes a radially outermost perimeter portion which serves as an ink bearing medium contacting peripheral surface, said outermost perimeter portion having an outermost edge and being smooth and continuous and being such that a bonding force with respect to the ink is less than a sum of a bonding force between the ink bearing medium and the ink and a cohesive force of the ink itself, thereby preventing adherence of the ink to said contacting peripheral surface, wherein sides of said rotatable member have frusto-conical surfaces and the sides of said rotatable member are continuous with the contacting peripheral surface, which is linear in cross-section at a position of contact with the medium.

2. A printer as claimed in claim 1, further comprising a scan-type carriage, wherein said rotatable member rotates in a scan direction of said carriage.

3. An ink printer for printing on an ink bearing medium using a liquid ink, said printer comprising:

at least one rotatable member arranged in a region of a transport path of the ink bearing medium, said rotatable member being contactable with the ink bearing medium at regions thereof upon which the ink has been deposited, wherein said rotatable member includes a radially outermost perimeter portion which serves as an ink bearing medium contacting peripheral surface, said outermost perimeter portion having an outermost edge and being smooth and continuous and being such that a bonding force with respect to the ink is less than a sum of a bonding force between the ink bearing medium and the ink and a cohesive force of the ink itself, thereby preventing adherence of the ink to said contacting peripheral surface, wherein said contacting peripheral surface is linear in cross-section at a position of contact with the medium and is provided at the periphery of said rotatable member, which is formed by a central ring disposed between two frusto-conical guide rings.

4. A printer as claimed in claim 3, further comprising a scan-type carriage, wherein said rotatable member rotates in a scan direction of said carriage.

5. An ink printer including a supply of liquid ink and a supply of ink bearing media, said printer comprising:

at least one rotatable member arranged in a region of a transport path of the ink bearing medium, said rotatable member being contactable with the ink bearing medium at regions thereof upon which the ink has been deposited, said rotatable member including an ink bearing medium contacting peripheral surface, wherein said ink bearing medium contacting peripheral surface has an outermost edge and is smooth and continuous such that said contacting peripheral surface continuously engages a printing surface of the medium when the rotatable member engages the medium surface, and a bonding force with respect to the ink is less than a sum of a bonding force between the ink bearing medium and the ink and a cohesive force of the ink itself, thereby preventing adherence of the ink to said contacting peripheral surface, wherein sides of said rotatable member have frusto-conical surfaces and wherein the sides of said rotatable member are continuous with the contacting peripheral surface, which is linear in cross-section at a position of contact with the medium.

6. A printer as claimed in claim 5, further comprising a scan-type carriage, wherein said rotatable member rotates in a scan direction of said carriage.

7. An ink printer including a supply of liquid ink and a supply of ink bearing media, said printer comprising:

at least one rotatable member arranged in a region of a transport path of the ink bearing medium, said rotatable member being contactable with the ink bearing medium at regions thereof upon which the ink has been deposited, said rotatable member including an ink bearing medium contacting peripheral surface, wherein said ink bearing medium contacting peripheral surface has an outermost edge and is smooth and continuous such that said contacting peripheral surface continuously engages a printing surface of the medium when the rotatable member engages the medium surface, and a bonding force with respect to the ink is less than a sum of a bonding force between the ink bearing medium and the ink and a cohesive force of the ink itself, thereby preventing adherence of the ink to said contacting peripheral surface, wherein said contacting peripheral surface is linear in cross-section at a position of contact with the medium and is provided at the periphery of said rotatable member, which is formed by a central ring disposed between two frusto-conical guide rings.

8. A printer as claimed in claim 7, further comprising a scan-type carriage, wherein said rotatable member rotates in a scan direction of said carriage.

9. An ink printer for printing on an ink bearing medium using a liquid ink, said printer comprising:

at least one rotatable member arranged in a region of a transport path of the ink bearing medium, said rotatable member being contactable with the ink bearing medium at regions thereof upon which the ink has been deposited, wherein said rotatable member includes a radially outermost perimeter portion which serves as an ink bearing medium contacting peripheral surface, said outermost perimeter portion having an outermost edge and being smooth and continuous and being such that a bonding force with respect to the ink is less than a sum of a bonding force between the ink bearing medium and the ink and a cohesive force of the ink itself, thereby preventing adherence of the ink to said contacting peripheral surface, wherein sides of said rotatable member have frusto-conical surfaces and the sides of said rotatable member are continuous with the contacting peripheral surface.

10. A printer as claimed in claim 9, further comprising a scan-type carriage, wherein said rotatable member rotates in a scan direction of said carriage.

11. An ink printer for printing on an ink bearing medium using a liquid ink, said printer comprising:

at least one rotatable member arranged in a region of a transport path of the ink bearing medium, said rotatable member being contactable with the ink bearing medium at regions thereof upon which the ink has been deposited, wherein said rotatable member includes a radially outermost perimeter portion which serves as an ink bearing medium contacting peripheral surface, said outermost perimeter portion having an outermost edge and being smooth and continuous and being such that a bonding force with respect to the ink is less than a sum of a bonding force between the ink bearing medium and the ink and a cohesive force of the ink itself, thereby preventing adherence of the ink to said contacting peripheral surface, wherein said contacting peripheral surface is provided at the periphery of said rotatable member, which is formed by a central ring disposed between two frusto-conical guide rings.

12. A printer as claimed in claim 11, further comprising a scan-type carriage, wherein said rotatable member rotates in a scan direction of said carriage.

13. An ink printer including a supply of liquid ink and a supply of ink bearing media, said printer comprising:

at least one rotatable member arranged in a region of a transport path of the ink bearing medium, said rotatable member being contactable with the ink bearing medium at regions thereof upon which the ink has been deposited, said rotatable member including an ink bearing medium contacting peripheral surface, wherein said ink bearing medium contacting peripheral surface has an outermost edge and is smooth and continuous such that said contacting peripheral surface continuously engages a printing surface of the medium when the rotatable member engages the medium surface, and a bonding force with respect to the ink is less than a sum of a bonding force between the ink bearing medium and the ink and a cohesive force of the ink itself, thereby preventing adherence of the ink to said contacting peripheral surface, wherein sides of said rotatable member have frusto-conical surfaces and wherein the sides of said rotatable member are continuous with the contacting peripheral surface.

14. A printer as claimed in claim 13, further comprising a scan-type carriage, wherein said rotatable member rotates in a scan direction of said carriage.

15. An ink printer including a supply of liquid ink and a supply of ink bearing media, said printer comprising:

at least one rotatable member arranged in a region of a transport path of the ink bearing medium, said rotatable member being contactable with the ink bearing medium at regions thereof upon which the ink has been deposited, said rotatable member including an ink bearing medium contacting peripheral surface, wherein said ink bearing medium contacting peripheral surface has an outermost edge and is smooth and continuous such that said contacting peripheral surface continuously engages a printing surface of the medium when the rotatable member engages the medium surface, and a bonding force with respect to the ink is less than a sum of a bonding force between the ink bearing medium and the ink and a cohesive force of the ink itself, thereby preventing adherence of the ink to said contacting peripheral surface, wherein said contacting peripheral surface is provided at the periphery of said rotatable member, which is formed by a central ring disposed between two frusto-conical guide rings.

16. A printer as claimed in claim 15, further comprising a scan-type carriage, wherein said rotatable member rotates in a scan direction of said carriage.

* * * * *

UNITED STATES PATENT AND TRADEMARK OFFICE

CERTIFICATE OF CORRECTION

PATENT NO. : 5,850,233 Page 1 of 2

DATED : December 15, 1998

INVENTOR(S) : OTSUKA ET AL.

It is certified that error appears in the above-indentified patent and that said Letters Patent is hereby corrected as shown below:

On the title page item,

[63] Related U.S. Application Data:

Line 2, "58,492" should read --584,923--.

[56] References Cited:

FOREIGN PATENT DOCUMENTS,

"5456847" should read --54-56847--.

"6071260" should read --60-71260--.

COLUMN 2:

Line 8, "and" should read --to--.

COLUMN 4:

Line 33, "printing," should read --printing and feeding advancement,--.

Line 41, "has" should read --has been--.

COLUMN 6:

Line 44, "both-sides" should read --both sides--.

CERTIFICATE OF CORRECTION

PATENT NO. : 5,850,233

DATED : December 15, 1998

INVENTOR(S) : OTSUKA ET AL.

It is certified that error appears in the above-indentified patent and that said Letters Patent is hereby corrected as shown below:

COLUMN 14:

Line 11, "will" should read --will be--.

Line 49, "gage" should read --tage--.

Signed and Sealed this

Seventeenth Day of August, 1999

Attest:

Q. TODD DICKINSON

Attesting Officer

*Acting Commissioner of Patents and Trademarks*